Feb. 6, 1968 — R. AFFRI — 3,367,174
PENETRATION-BODY HARDNESS TESTING
Filed July 19, 1965 — 2 Sheets-Sheet 1

Riccardo Affri
INVENTOR.

BY Karl J. Ross
Attorney

Page 1 …

United States Patent Office 3,367,174
Patented Feb. 6, 1968

3,367,174
PENETRATION-BODY HARDNESS TESTING
Riccardo Affri, Via Campo dei Fiori,
26 Induno Olona, Varese, Italy
Filed July 19, 1965, Ser. No. 473,004
Claims priority, application Italy, July 22, 1964,
15,956, Patent 732,380
4 Claims. (Cl. 73—83)

ABSTRACT OF THE DISCLOSURE

Hardness tester having a penetration body shiftable relatively to an indicator connected with another body, a loading mechanism adapted to urge the penetration body (e.g., a point, cone or ball) against the specimen, and a spring relieving the loading mechanism so that substantially only the weight of the penetration body is initially applied against the specimen, a housing structure movable in the direction of movement of the penetration body for relieving the spring to render the loading mechanism effective and a clutch between the measurement body and the penetration body and operable upon the movement of the housing member to interconnect the indicator with the penetration body and indicate the degree of penetration of the specimen under the load mechanism.

---

Figure 1:
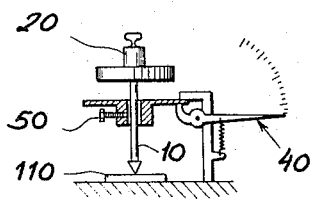

The present invention relates to penetration-body hardness testing.

In penetration-body hardness testing using such testers as are associated with the names Brinell, Rockwell and Vickers there is a need for an effective method of applying loads and/or for ascertaining the depth of penetration of the penetration bodies, and this involves, in part, the provision of an effective blocking device or clutch.

As is known, the functioning and use of hardness testers operating with penetrating bodies generally includes a step wherein the penetrating body is moved into contact with the workpiece whose hardness is to be measured or wherein, conversely, one moves the workpiece into contact with the penetrating body, then presses them together with a relatively slight so-called preload, and takes a reading, from a scale indexed to give direct readings of degrees of hardness, of the depth of penetration of the penetrating body under the effect of the force. The conventional method, in the manner described above, requires a certain amount of time and experience, especially when numerous pieces are to be checked. The principal cause of loss of time was and is the setting of the instrument to zero, which is necessary after the application of the preload and before the application of the actual load or additional load. Finally, the setting of the device to zero requires a certain amount of experience on the part of the operator. In fact, in these measurements, tolerances of 1 micron and even less correspond to high percentile error, so even the slightest negligence in any of the operations whatever and especially in the most important, namely the aforementioned setting to zero, can compromise the result of the measurement. Furthermore, the possibility always exists that, by an oversight on the part of the operator, the zero-setting step is omitted. One can obtain a true appreciation of the importance of not making such mistakes if one considers the consequences which can arise with essential parts if, in the case of those parts having in reality inferior qualities, qualities superior to those of safety are presumed from erroneous readings, for instance in the case of machine parts when human lives depend upon their functioning reliably.

Numerous attempts have already been made to eliminate these shortcomings, but they have not led to any effective solution to the problem. It has for instance been suggested that a friction clutch be provided, between the penetrating body and the measuring agent, such that the preload is applied by this clutch and its magnitude corresponds to the transmission capacity or to the slip resistance of the clutch. Upon the slippage, synchronization occurs between the permanent zero reading of the tester in the entire preload phase and the commencement of the useful displacement, which synchronization is necessary to the measurement and determination of the hardness. In these instruments, the friction clutch, which first of all serves for stabilizing the preload and setting the zero, serves, during the measuring phase, to entrain the measuring part which establishes the extent of penetration of the penetrating part. It is obvious that no constant preloads can be achieved with an instrument of this kind. The efficiency of a friction clutch in fact depends upon too many variable factors which can falsify the constancy of the transmission capacity, the magnitude of the preload and, therefore of the entire check. The friction depends on the state of finish and of preservation of the surfaces at the engaging parts, on the state of lubrication, on the temperature, and on many other factors.

Even further attempts, which were carried out to eliminate the setting to zero, were negative, at least as far as accuracy is concerned. They do lead to a slight shortening of the measurement times, but at the cost of accuracy.

It is an object of this present invention to minimize the aforesaid disadvantages.

The invention starts from the principle of providing a device, in addition to the penetrating part, which is completely independent of the apparatus for measuring the depth of penetration and to provide, between these two parts, a locking or blocking device or clutch, which is automatically locked and released in two separate phases determined by the measuring sequence.

The blocking device in no way interferes with the measurement or application of the loads, which are therefore to be considered as corresponding to the desired or theoretical requirements. The provision of this blocking device naturally makes the separate step of setting the device to zero superfluous and makes varied application of the instrument possible, be it loaded with weights or with spring tension, or with hydraulic pressure. It is therefore obvious that testers according to the invention can be portable instruments or table instruments, which work by hydraulic pressure, by manual actuation or mechanically or by virtue of the force of gravity.

Preferably the loads determining the measuring effects are produced by weights, since weights are preeminently suited for precision. It is also important, for reasons of the simplicity of the device, that the preload be formed by the "free" weight of the penetrating part itself and of the connected parts, which are, if necessary, tared or counterbalanced until the predetermined preload is reached. Advantageously, the weight of the penetrating part and of the normally connected or connectible parts is as great as the preload and is, if need be, made up in part by ballast to the extent to which the preload must be varied. This holds good for instruments of any desired size.

Figure 5:
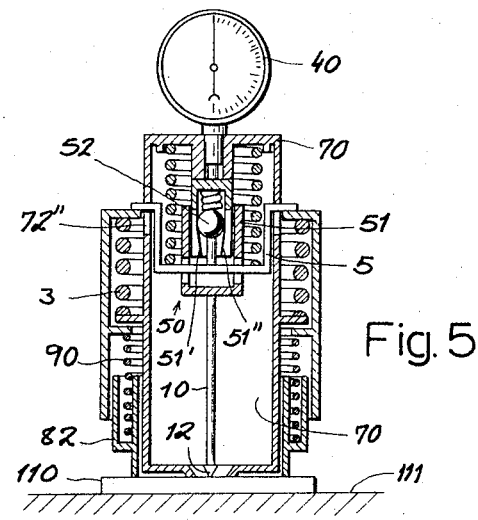
Figure 6:
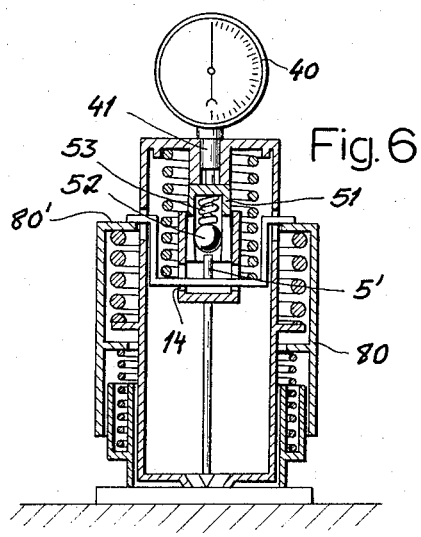
Figure 2:
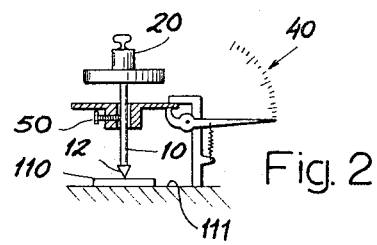
Figure 3:
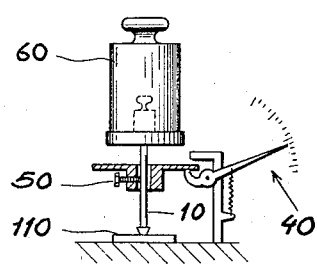
Figure 7:
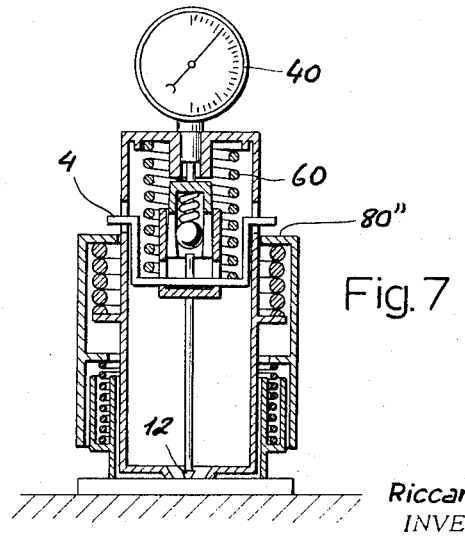
Figure 4:
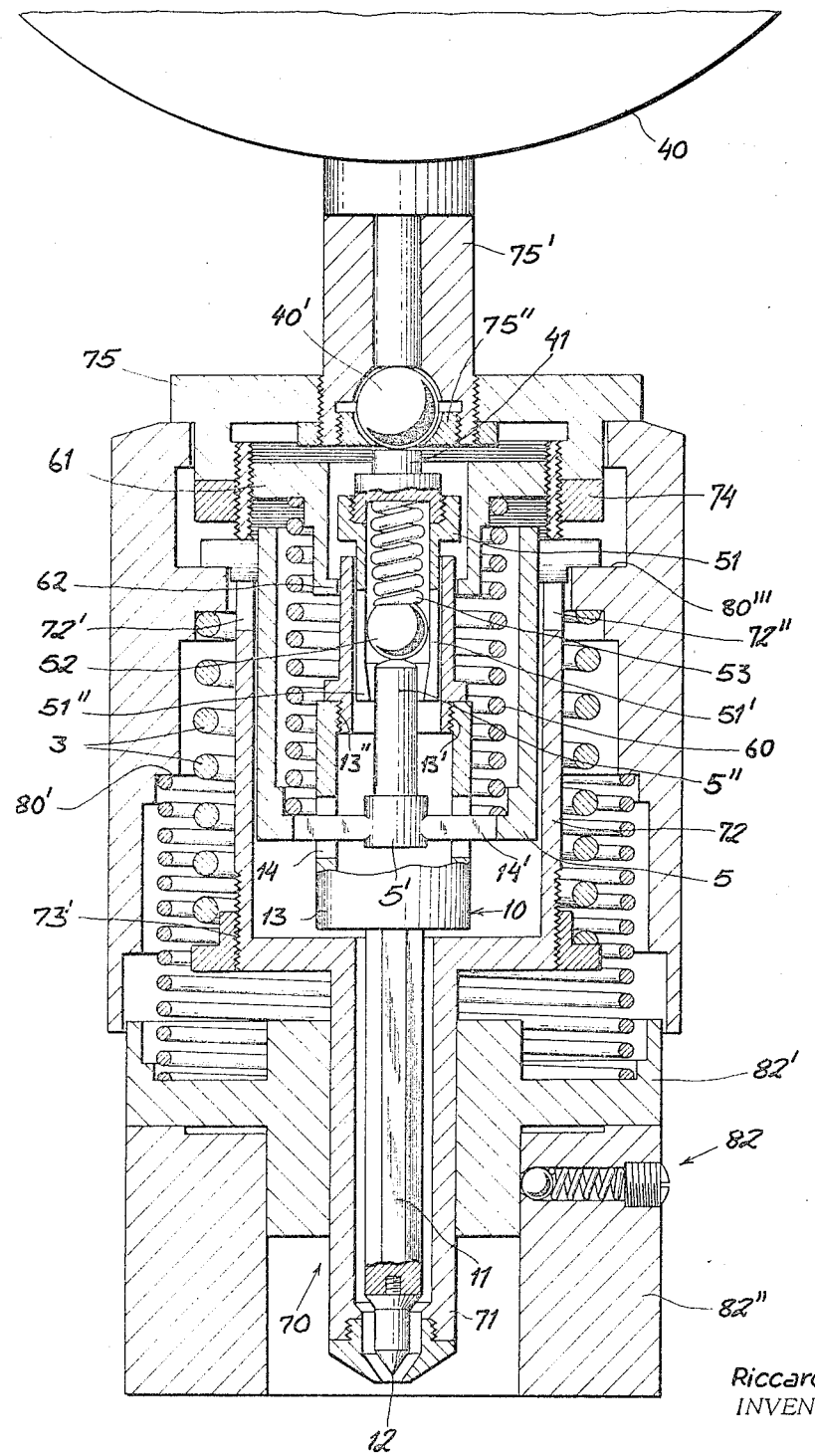

The invention is further explained by way of example with reference to the accompanying drawings in which several practical specific embodiments are schematically portrayed, and in which:

FIGS. 1, 2 and 3 are diagrammatic elevational views showing schematically the principle on which the invention is based, the three diagrams showing three operational phases of the method according to the invention;

FIG. 4 is a schematic diagram, in vertical axial section, of an embodiment of the invention, wherein the loads are formed by the result of the free weight of the penetrating part and of the direct or resultant forces of several springs, which also automatically actuate the synchronizing device between measuring instrument and penetrating part, the instrument being shown in its nonworking position; and FIGS. 5, 6, and 7 are schematic diagrams on a reduced scale, showing the device of FIG. 4 in the three operating positions corresponding to the phases shown in FIGS. 1, 2 and 3, respectively.

For ease of understanding, like parts are indicated by like reference numbers in all the figures.

A hardness tester consists usually of a penetrating part (e.g. ball or point) 10, means 20 (here represented as a small weight) for applying a preload to the penetrating part 10, means 60 (represented as a large weight) for applying the measuring or additional load with the weight 20 to the penetrating part 10 and a comparative measuring instrument 40 for ascertaining the depth of penetration of the penetrating part under the effect of the additional load 60. Preferably the scale of the measuring instrument is arranged to provide direct readings in appropriate units of hardness.

According to the invention, the penetrating part 10 is mechanically independent of the measuring instrument 40, and, provided between these two parts, there is a clutch or blocking device 50, which serves to interconnect the penetrating part and the measuring instrument 40 only during the actual measurement of a particular specimen to be tested. The method according to the invention is executed as follows: the sample 110 is moved into contact with the penetrating part 10, or vice versa, whereby a preload, which is preferably formed by the free weight of the penetrating part, is applied to one of the two parts in the direction of the other; then the comparative measuring instrument 40 is connected to the penetrating part 10 by actuation of the locking device or clutch 50 (the indicator of the measuring instrument 40 is naturally continuously in its zero setting at least up to the closure of the clutch 50), then the additional load is applied and finally the depth of penetration of the penetrating part 10 under the effect of the additional load 60 is read in "hardness" units from the scale. The clutch 50 can, in its simplest form (FIGS. 1, 2 and 3), consist of a radial screw, actuatable by hand as shown, but it is obvious that this clutch can have a variety of forms such as those shown in FIGS. 4 to 7 and preferably is actuated automatically from that part of the device which causes the application of the loads. It is clear from FIGS. 1, 2 and 3, that the application of the loads can take place in various ways, for example by weights, springs, manual pressure, hydraulic pressure and the like.

In the device of FIGURES 5–7 the penetrating part 10 consists of a hexagonal rod 11 into the end of which is threaded a penetrating member 12, such as for instance a Brinell, Rockwell or Vickers penetrating part or the like. The upper body of the rod 11 is formed with a cup 13, and two or more longitudinal canals or passages 14 are provided in the upper part of the cup. The upper part of the rod is provided at 13' with a female thread for engagement with the sleeve 13", whose function will be explained more precisely later. The penetrating part 12 is guided and encased by the substantially tubular probe body 70 enclosing the entire height of the instrument. The probe 70 consists of a lower tubular portion 71 connected to an upper cup-shaped portion 72. The cup 72 is provided with an external thread at its base 73' and at its mouth 73, and with an internal thread at the upper end 73"; the cup 72 also has at its upper part two or more vertical canals 72". Threaded onto the upper part 73 are a ring 74 and a lid 75 bearing the measuring instrument. Outside the probe body 70 is the tubular instrument housing 80, which has in its interior three steps or shoulders 80', 80" and 80"', which form respective stops for the spring 90 of the pressure body, for the supplementary spring 3 and for the stop arms 4 of the stirrup 5 respectively. The stirrup 5 is the part which controls almost the entire operation of the instrument. It has the shape of a cup and its base is formed by two or more spokes or arms 14', which pass through the recesses 14 and carry the lower end of the measuring load spring 60. The spokes 14' converge towards the center and terminate at a hub 5', upon which stands a pin 5". Furthermore, the stirrup 5 has the two or more radial arms 4 already mentioned, which pass radially through the recesses 72". Affixed at the thread 73" to the cup 72 is a cap 61, which serves as a seat for the upper end of the spring 60 and has an extension 62, which extends downwards and guides the upper end of the sleeve 13" and consequently of the penetrating part 10.

The penetrating part 10 is connected to the measuring instrument 40 (e.g. as shown in FIGS. 5, 6 and 7) via the extension 41. The measuring instrument is not portrayed in FIG. 4, but it lies above the ball 40'. The extension 41 consequently acts upon the ball 40'. The ball 40' is securely housed between the two clamps 75' and 75" and can be linked to any desired mechanical measuring instrument, as for example a comparing instrument shown in FIGS. 5, 6 and 7, or a hydraulic measuring instrument, such as a sensitive mercury instrument.

Provided between the extension 41 and the penetrating part 10 is a clutch 50, which forms a substantial part of the invention. The clutch is formed by the sleeve 13", a flexible case 51 expandable against this sleeve, a ball 52 for expanding the case and a spring 53. The sleeve 13" has a cylindrical inner cross section, whereas the outer diameter of the flexible case 51 is somewhat smaller than the inner diameter of the sleeve 13", so that under normal conditions an almost frictionless displacement can take place between these two parts. The lower end of the case 51 is subdivided into several sectors, for instance six, by six longitudinal cuts 51'. In the region of this lower part the case has a tapered inner wall 51". Disposed in the case 51 is the ball 52, whose diameter is somewhat smaller than the diameter of the cylindrical part of the case 51, but larger than that of the tapered part 51", so that when the ball is pressed downwardly, it acts on the sectors 51" as well as on the inclined planes formed thereby and expands the case to clamp it against the sleeve 13". The ball 52 is pressed by the spring 53 (FIGS. 6 and 7) into the tapered part 51". However, as is shown in FIGS. 4 and 5, as soon as the part 5" keeps the ball 52 raised and keeps the spring 53 compressed, the sectors 51" adopt by virtue of their natural flexibility a completely cylindrical shape, whereby the penetrating part 10 and the sleeve 13" can be freely shifted without influencing the measuring instrument. The instrument is completed by the pressure body 82, which is formed by a telescopic body consisting if need be of two parts 82' and 82", which parts run on the outside on the shaft 71 of the probe 70 and on the inside on the member 80. The pressure body 82 is kept in the extended position by the spring 90. In the case of a portable instrument it is sufficient to dispose two radial, horizontal and diametrally opposed handles on the member 80 and to lay the sample 110 on any desired base. In a table instrument it is sufficient to fasten the instrument by the member 80, for instance radially, to a column and to make the base 111 as movable, so that it can be moved with force toward the instrument. With these qualifications and in virtue of the preceding description of FIGS. 1, 2 and 3, the method of function of the instrument portrayed in FIG. 4 as well as 5, 6 and 7 is easily understandable. For the explanation of the method of function it has been assumed that it is a question of a portable instrument.

The sample is placed upon a sufficiently stable base and the instrument superimposed with its pressure body 82 onto the sample 110. The body 80 is then pressed with the use of force onto the sample, whereby to begin with the spring 90 and then the spring 3 are compressed. Strictly speaking, the pressure body 82 holds the sample 110 fast and pushes itself into the body 80, so that the probe 70 is also pushed in, compressing the spring 3 and applying the penetrating part 12 against the sample with the entire weight of the penetrating body 10 together with the sleeve 13″. The weight of this complex is harmonized with the preload and one has in this way executed the preload phase (FIG. 5). When the body 80 is further pressed downwards and the springs 90 and 3 are compressed, the lid 75 retreats from the upper end of the body 80 and the arms 14′ and the entire stirrup 5, including the stirrup arms 14′, the hub 5′ and the part 5″, shift downwards, accompanying the body 80 with regard to the penetrating part 10–12, 13″ and with regard to the probe complex 70–71–72–73. This movement is made possible by the canals 14 and 72″. Upon the shifting down of the part 5″, the ball 52 is pressed into the tapered part by the spring 53 and consequently the flexible case 51 is expanded and locks itself in the sleeve 13″. At this moment (FIG. 6) the penetrating part 10–13, the extension 41 and the balance of the instrument 40 are connected to each other and the instrument finds itself ideally in a position to receive the additional load, with the measuring instrument still in the zero position, that is to say it was brought automatically into the zero position. If the body 80 is pressed further downwardly against the sample 110, the stirrup 5 shifts downwardly until such time as the spokes 14′ rest on the end of the canals 14. Upon the further shifting down of the body 80, the arms 4 are released by the (abutment) shoulder 80‴ and the entire force of the spring 60, which was previously entirely retained by the stiffer spring 3, becomes operative in its entirety upon the penetrating part 10–12. Since the force of the spring is kept exactly equal to the additional load, in this way the additional force comes into use (FIG. 7). Although the clutch 50 leads to an extremely secure blocking between the penetrating part 10 and extension 41 which even withstands relatively high axial stresses, this clutch is not exposed to any particular stress by loading and only has to overcome the passive resistances of the measuring instrument 40, which usually amount to several grams. The theoretical considerations have been proved by practical findings. Repeated tests have shown an almost absolute constancy of the performance figures of the instrument, such as could not be achieved with the instruments known at present.

The invention has been described merely by way of example and without any limitation whatsoever, and it is obvious that numerous modifications could be undertaken without in so doing exceeding the scope of the invention.

What I claim is:

1. A hardness tester comprising an elongated penetration member having a penetration body applicable against a specimen and loadable to indicate the hardness of said specimen under the load applied to said member; a measurement member shiftable relatively to said penetration member and having indicating means for translating movement of the penetration member into a reading of penetration; means for loading said penetration member to effect penetration of said body into said specimen; and a clutch for releasably interconnecting said penetration member with said indicating means, said clutch including a pair of coaxially disposed tubular elements respectively coupled with said penetration member with said indicating means, the inner of said elements being expandable outwardly, and a further element within said inner of said elements and operable upon the application of the tester against said specimen after an initial engagement of said body with said specimen to deform the inner element outwardly against the outer of said elements and couple the penetration member with said indicating means.

2. A tester as defined in claim 1 further comprising a housing having a first tubular portion surrounding said members and engageable with said specimen, and a second tubular portion surrounding said first tubular portion and axially shiftable relatively thereto, said loading means including a spring received in said first tubular portion coaxial with said members, relieving means axially shiftable in said housing and biased by said spring in the direction of said specimen for applying the force of said spring to said penetration member in a relieved condition of the spring, said relieving means being engageable by said second tubular portion for withdrawing said relieving means in a direction away from said specimen.

3. A tester as defined in claim 2 wherein said further element is a ball received within the inner element and axially shiftable therein, said relieving means controlling the displacement of said ball.

4. A tester as defined in claim 3, further comprising another spring resiliently connecting said tubular portions and urging said second tubular portion away from said specimen while having a strength greater than that of the first-mentioned spring, said relieving means being held by said first spring against said second tubular portion and said ball being retained by said relieving means in a position in which said inner element is undeformed while said second portion maintains said first spring in a stressed condition, said ball being shifted by said relieving means into a position in which it deforms said inner element upon axial movement of said second portion toward said specimen against the force of said other spring to relieve said first spring, said penetration member being freely shiftable within said housing while said relieving means retains said first spring in said stressed condition whereby said penetration member rests solely with its weight upon said specimen in the latter condition of said first spring.

References Cited

UNITED STATES PATENTS

| | | | |
|---|---|---|---|
| 3,283,566 | 11/1966 | Fietz | 73—81 |
| 3,200,640 | 8/1965 | Ernst | 73—81 |
| 3,182,491 | 5/1961 | Tschirf et al. | 73—83 |

RICHARD C. QUEISSER, *Primary Examiner.*

JAMES J. GILL, *Examiner.*

J. J. SMITH, C. I. McCLELLAND, *Assistant Examiners.*